United States Patent Office 2,924,286
Patented Feb. 9, 1960

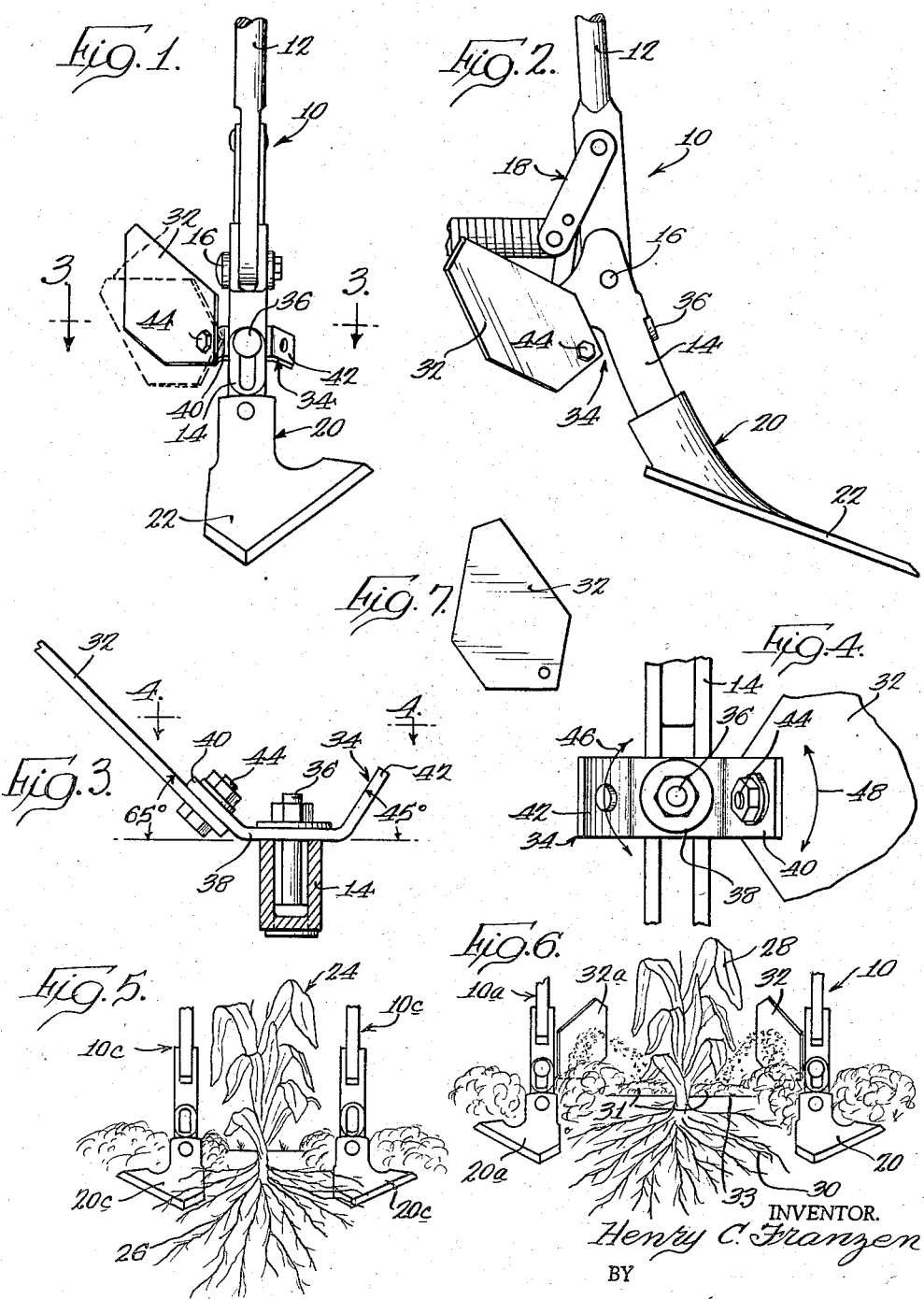

2,924,286
ROOT SAVING CULTIVATOR
Henry C. Franzen, Pontiac, Ill.
Application March 3, 1958, Serial No. 718,597
2 Claims. (Cl. 172—194)

My invention relates to the cultivation of row crops by cultivators attached to tractors.

One object of my invention is to provide an improved row cultivator that materially increases the rate of growth and development of corn and other row crops by improved cultivation which protects the root systems of the plants while at the same time loosening the soil around the root systems and covering the ground all the way up to the plants with a layer of loosened soil of controlled thickness.

Another object is to provide an improved cultivator which will provide the superior cultivation of row crops recited in the above object when attached to a tractor and operated at either high speeds or reduced speeds, thus affording in addition to the advantages of the superior crop cultivation characteristic of the improved cultivator a more advantageous and efficient utilization of the high speed capabilities of modern tractors in the field.

A further object is to provide an improved cultivator as recited in the previous objects which has a flexibility of adjustment that provides the full advantages of the improved cultivation when the cultivator is operated at different speeds, when it is used to cultivate different row crops and crops at different stages of growth, and when it is used to work soils which differ in composition and moisture content.

Other objects and advantages will become apparent from the following description of the exemplary embodiment of my invention illustrated in the drawings, in which:

Figure 1 is a front view of a row crop cultivator embodying my invention;

Fig. 2 is a side view of the improved cultivator;

Fig. 3 is a sectional view taken along the line 3—3 of Fig. 1 and showing two support bracket wings that are used in the alternative for the purpose of cultivator adjustment;

Fig. 4 is a fragmentary rear view taken from the line 4—4 of Fig. 3 and showing two separate axes of cultivator adjustment;

Fig. 5 is a front view illustrating the cultivation of a row crop by a pair of conventional cultivators;

Fig. 6 is a front view illustrating the cultivation of a similar row crop by a pair of my improved cultivators; and Fig. 7 is a side view of the kinetic soil distributing wing of my improved cultivator.

For convenience in description, the physical embodiment 10 of my invention illustrated in the drawings, Figs. 1 and 2, will be referred to as a "cultivator." Designed to cultivate one side of a row crop, the cultivator 10 comprises a depending shank 12 adapted to be attached to a tractor (not shown) by means of a conventional cultivater frame and control mechanism (not shown). The upper end of a shovel or sweep support foot 14 is pivoted to the lower end of the shank 12 to extend forwardly and downwardly at a steep angle from the shank as shown in Fig. 2. Rearward swinging movement of the foot 14 about its support pivot 16 is restrained by a spring biased trip linkage 18 connected between the foot 14 and the shank 12 and having sufficient strength to resist rearward forces on the foot during normal use of the cultivator. However, in the event the foot 14 meets with an obstruction that would overstrain the cultivator, the linkage 18 will trip, allowing the foot 14 to swing rearwardly to clear the obstruction.

The particular cultivator 10 shown in Figs. 1 to 4 is designed to cultivate the left side of a row as the cultivator moves forwardly (toward the viewer with reference to Fig. 1). The lower end of the foot 14 supports a detachable shovel or sweep 20 adapted to till the soil adjacent one side of a row crop.

A most significant feature of the sweep 20 is its asymmetrical lateral shape as viewed from the front, Fig. 1. The structure of this sweep is marked by the presence on only one side of the sweep—the side (to the right in Fig. 1) opposite the row side of the sweep—of a blade 22 extending laterally from the lower or point end of the sweep and forming a major portion of its width as viewed from the front. This blade extends laterally the action of the sweep 20 in breaking and loosening soil on the blade side of the sweep. The opposite or row side of the sweep extends only slightly beyond the foot 14 where it terminates in a generally straight edge substantially parallel to the foot, Fig. 1.

As described up to this point, the component structure of the improved cultivator 10 is identical with that of conventional cultivators now in use. As a matter of fact, the structure of a conventional cultivator is incorporated bodily into the improved cultivator, thus saving the cost of designing and manufacturing special equipment for this purpose.

Before continuing with the description of the improved cultivator 10 embodying my invention, it will be helpful to look briefly to the cultivating action of conventional cultivators. As shown in Fig. 5, two conventional cultivators 10c are lowered into the earth and move simultaneously along opposite sides of a row of corn 24. The construction of each cultivator 10c is identical to that of the previously described components of the improved cultivator 10, except that the sweeps 20c of the respective cultivators are mirror images of each other. Figure 5 accurately depicts the cultivating action of conventional cultivators in which the sweeps 20c cut through the root system 26 of each plant 24 cultivated. This damages the root system 26, cutting off many roots and otherwise disrupting the system with consequent stunting of growth. Even though the overall effect of the cultivation is to stimulate plant growth, the disturbance of the plant root systems and severing of roots by conventional cultivators nevertheless stunt or reduce plant growth as compared to what it would otherwise be if the soil loosening and tilling action could be achieved without damaging the root systems of the crops.

The damaging of the root systems of plants cultivated by conventional cultivators is unavoidable, since it results from a compromise between two objectives, both of which together cannot be accomplished completely by a conventional cultivator. One objective is to loosen the soil around the root system of a plant without damaging the roots. Another objective or requirement of cultivation is that the ground around the plants be covered with loose soil to cover and kill off weeds around the plant and otherwise provide cultivation immediately adjacent the plants. If, on the one hand, the cultivators most nearly adjacent the row are spaced sufficiently from the plants to avoid damage to the underground root systems, a strip of ground extending to each side of the plants will be left uncovered by loosened soil. This, of course, is intolerable as it allows weeds to grow and does not provide the desired blanket of loosened soil immediately adjacent the plants. If, on the other hand, the cultivators are moved in sufficiently close to the plants to cover all the weeds and throw loosened dirt up to the plants, the sweeps running underground then cut off many roots as illustrated in Fig. 5. Forming the sweeps 20c in the asymmetrical manner described, in which the sweeps are clipped on the side adjacent the row, helps some in reducing damage to plant roots but does not by any means eliminate such damage.

It will be understood that even though only one cultivator or sweep is illustrated on each side of the row in Fig. 5, other cultivators and sweeps are at the same time used in a conventional manner to till soil more remote from the row. However, only one sweep on each side is shown since the damage to the plant root systems by this sweep is the particular concern of the present invention.

As contrasted to prior cultivators, the improved cultivator 10 provided by the present invention operates with great effectiveness and efficiency to loosen the soil around the root systems of row crops without disturbing or significantly damaging the root systems, while at the same time acting to cover the ground all the way up to the plants with a loosened layer of soil having a thickness which can be controlled to provide the optimum weed covering action and the most desirable blanketing with loosened soil of the ground immediately adjacent the plants.

The cultivating action of improved cultivators 10 and 10a provided by the invention is illustrated in Fig. 6. The cultivator 10a is identical to the cultivator 10 except as it is adapted as shown to cultivate the side of the intervening plants 28 opposite from the cultivator 10. While the improved cultivator can be used to great advantage in cultivating many different row crops, it is particularly useful in cultivating corn, the plants 24 and 28 (Figs. 5 and 6) being illustrations of this crop.

As shown in Fig. 6, the cultivators 10 and 10a are both spaced from the intervening plant 28 sufficiently to avoid disturbing or damaging the underground root system 30 of the plant. The widened space between each cultivator and the plant is necessarily of such an extent that it would not be properly covered with loosened soil by a conventional cultivator. Yet the improved cultivator incorporating the present invention not only operates to cover the ground all the way up to the plant 28 with a layer or blanket 31 of loosened soil, but it also provides a flexibility of adjustment which assures complete coverage of the intervening ground and control of the depth of the blanketing layer of loosened soil under various soil conditions, and for different operating speeds of the tractor (not shown) to which the cultivators are attached. This action is produced by the kinetic action of a generally flat, soil distributing wing 32 located rearwardly of the sweep 20 (Figs. 1 to 4, and 6), which extends below the level 33 of the unbroken ground, and supported a substantial distance above the unbroken ground level 33 by adjustable support means on the foot 14 which provides multiple adjustments adequate for holding the distributing wing in proper positions under various operating and soil conditions, which positions provide the optimum kinetic distribution of loosened soil extending all the way up to the particular crops cultivated.

For this purpose, a generally rectangular support bracket 34 is attached to the rear portion of the foot 14 by a single bolt 36 extending rearwardly through the foot and through a central flat portion 38 of the bracket. As shown, the bracket 34 is attached to the foot 14 above the top of the sweep 20. The significant positional relationship, however, is the location of the bracket 34 way above the level 33 of the broken ground and an even greater distance above the lower end of the sweep and sweep blade 22.

Opposite ends of the bracket 34 project beyond the foot 14, as shown in Fig. 3, to form two ears 40, 42 which are turned rearwardly at two substantially different angles with respect to the intervening central portion 38 of the bracket. The ear 40 is turned rearwardly at an angle of 65° as indicated in Fig. 3, and the ear 42 is turned rearwardly at an angle of 45° as indicated in the same figure. Upon loosening of the bolt 36, the bracket 34 can be turned end for end to project either of the ears 40, 42 beyond the row side of the foot 14. Each ear 40, 42 is apertured to receive a bolt 44 used to attach the soil distributing wing 32 to the ear on the row side of the cultivator.

The soil distributing wing 32 itself is formed from a flat steel plate having an oblong polygonal shape. As shown in Fig. 7, the distributing wing 32 may be aptly described as having a generally rectangular form, the four corners of which are clipped to provide an apex at each end of the wing. The single attaching bolt 44 extends through the apex at the lower end of the wing as this appears in Figs. 1 and 2. The oblong polygonal shaping of the wing 32 is of advantage in providing an optimum kinetic soil distributing action for the various postions of adjustment of the wing.

The extraordinary flexibility of adjustment is provided by the alternative use of either of the bracket wings 40, 42 which are turned rearwardly at different angles, by the adjustability of the bracket 34 through various small angles in either direction about the axis of the bolt 36 as indicated by the double-ended arrow 46 in Fig. 4, and by the adjustability of the kinetic soil distributing wing 32 in either direction about the axis of the bolt 44 as indicated by the double-ended arrow 48 in Fig. 4. It is noteworthy that adjustment of the kinetic soil distributing wing 32 about the bolt 44 is in a plane different from the adjustment of the bracket 34 and hence the wing 32 about the bolt 36 since the axes of the bolts 44 and 36 are turned at an angle relative to each other. Moreover, the angle between the bolts can be either 45° or 65°. One illustrative adjustment of the wing 32 about the bolt 44 is illustrated in dotted lines in Fig. 1.

The overall result of my invention is to provide the farmer with an improved cultivator at a cost only slightly greater than that of conventional cultivators already in use. My improved cultivator has sufficient versatility to provide its optimum efficiency when used at different operating speeds, when used to till different soils under different conditions, and when used to cultivate different row crops. However, the most striking and significant achievement is a noticeable and very material increase in the growth rate of crops cultivated by my improved cultivator. This increased growth rate, achieved simultaneously with the efficient weed covering and soil tilling action of the cultivator, is of great advantage to the farmer. Moreover, the improved cultivator in most instances can be operated at a speed considerably higher than the operating speed of conventional cultivators, thus permitting the farmer to cultivate his crops in a shorter length of time.

While I have shown a preferred embodiment of my invention, it will be apparent that variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A row cultivator comprising, in combination, a depending shank, a foot pivoted to the lower end of said shank, a trip linkage holding said foot in a normal extended position on said shank, a sweep secured to the lower end of said foot, said sweep including a single blade projecting from the lower end thereof laterally a substantial distance beyond one side of the foot, the side of the cultivator opposite from said sweep blade forming the row side of the cultivator at which the extent of said sweep laterally beyond said foot is limited to only a small fraction of the lateral extent of said blade beyond the foot, a double ended bracket secured to the rear of said foot at the upper end of said sweep by a single bolt extending centrally through the bracket, said bracket including two ears on opposite ends thereof turned rearwardly at angles of approximately 45° and 65° respectively with reference to the intermediate portion of the bracket, said bracket being adjustable rotatably around said bolt to locate either of said bracket ears on the row side of said foot in any angular position of adjustment around the axis of the bolt, each of said bracket ears defining a central bolt hole therein; and a flat kinetic soil distributing wing of generally elongated polygonal shape secured at one end by a single bolt to the bracket ear on the row side of said foot to extend upwardly and laterally from the last-mentioned ear in a position determined by adjustment of the soil distributing wing about the wing support bolt therefor, the adjustment of said bracket about said support bolt therefor, and by the bracket ear selected to extend beyond the row side of the cultivator to support said soil distributing wing.

2. A row crop cultivator comprising, in combination, depending support means including a foot on the lower end thereof and having one side designated as the row side of the cultivator, a sweep attached to the lower end of said foot, a portion of said support means having sufficient height above the lower end of said sweep to remain at all times above the level of the unbroken ground ahead of the sweep, a double-ended bracket secured to the rear of said portion of said support means by a single bolt extending through a medial portion of the bracket, said bracket including two ears on opposite ends thereof turned rearwardly at substantially different angles respectively with reference to the intermediate portion of the bracket, said bracket being adjustable rotatably around said bolt to project either of said bracket ears to the row side of said support means and to locate the ear on the row side of the support means in any angular position of adjustment around the axis of the bolt, a generally flat kinetic soil distributing wing shaped as an elongated hexagon defining an apex at each end of the wing, bolt means securing one apex of said wing to the bracket ear on the row side of said support means and providing for rotary adjustment of the distributing wing around the bolt means to locate the wing in a position projecting upwardly and laterally from the last-mentioned bracket ear to engage and kinetically distribute beyond the wing soil rising above its normal level to said wing from said sweep.

References Cited in the file of this patent

UNITED STATES PATENTS

| | | |
|---|---|---|
| 354,381 | Bourne | Dec. 14, 1886 |
| 484,273 | Wilson | Oct. 11, 1892 |
| 1,256,090 | Adkins | Feb. 12, 1918 |
| 1,543,115 | Long | June 23, 1925 |
| 1,580,405 | Brown | Apr. 13, 1926 |
| 1,602,992 | Skinner | Oct. 12, 1926 |
| 2,487,737 | Skinner | Nov. 8, 1949 |
| 2,742,843 | Redetzke | Apr. 24, 1956 |
| 2,771,832 | Doskocil | Nov. 27, 1956 |